Figure 1:
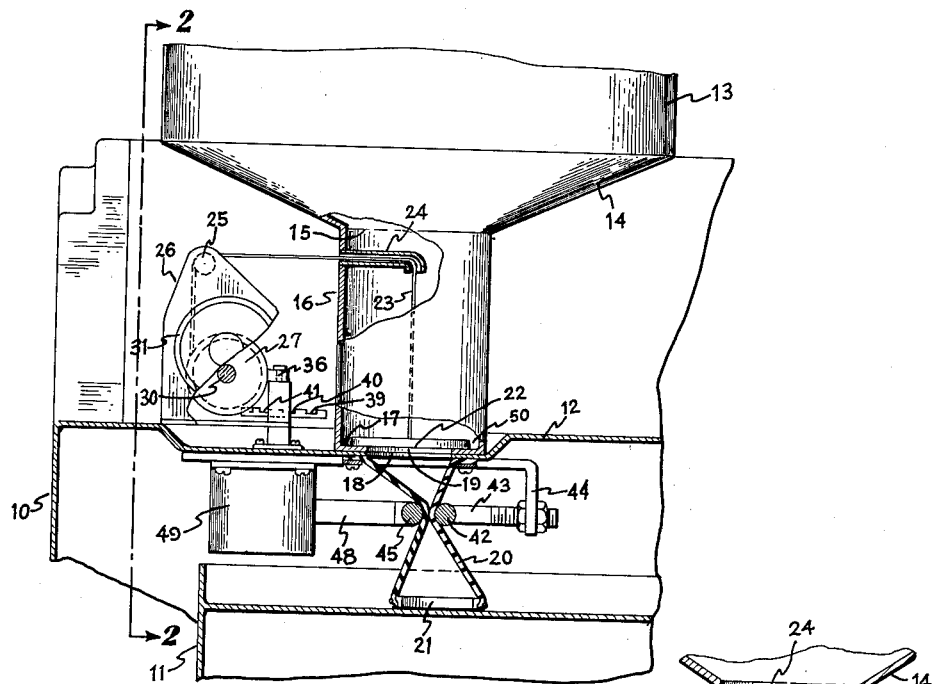

Aug. 27, 1963     M. B. LUCAS ET AL     3,101,871
METERING DISPENSER FOR AUTOMATIC WASHERS
Filed Sept. 29, 1960     2 Sheets-Sheet 1

INVENTOR.
MALCOLM B. LUCAS
BY THOMAS G DEWEES

Fredrick H. Braun
ATTORNEYS

Aug. 27, 1963
M. B. LUCAS ET AL
3,101,871
METERING DISPENSER FOR AUTOMATIC WASHERS
Filed Sept. 29, 1960
2 Sheets-Sheet 2
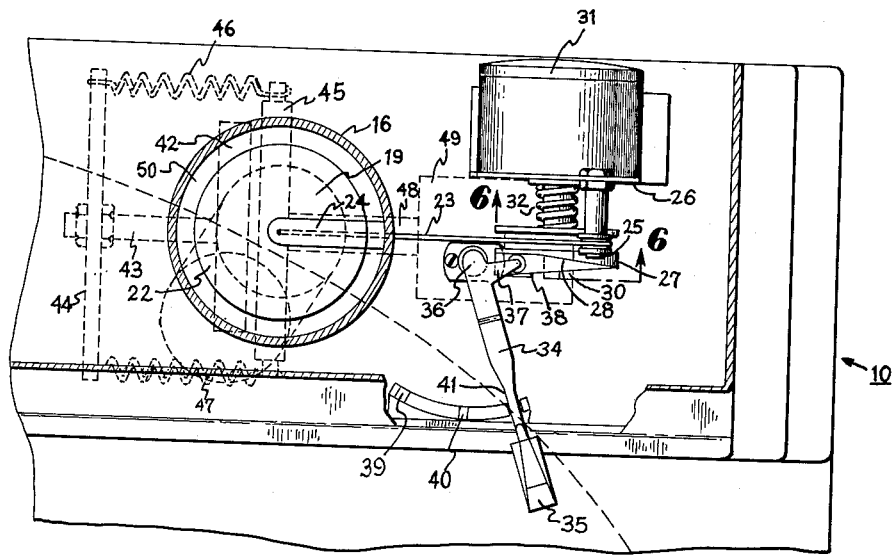
FIG. 4
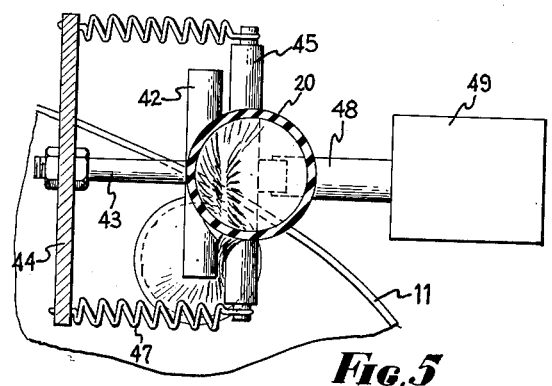
FIG. 5
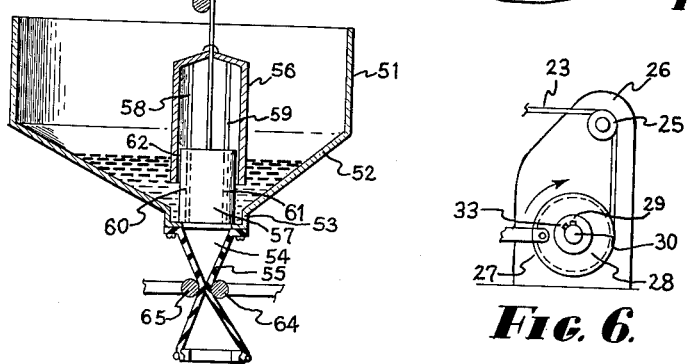
FIG. 7.
FIG. 6.
INVENTOR.
MALCOLM B. LUCAS
BY THOMAS G. DEWEES
Frederick H. Braun
ATTORNEYS

United States Patent Office 3,101,871
Patented Aug. 27, 1963

3,101,871
METERING DISPENSER FOR AUTOMATIC WASHERS
Malcolm B. Lucas and Thomas G. Dewees, Cincinnati, Ohio, assignors to The Procter & Gamble Company, Cincinnati, Ohio, a corporation of Ohio
Filed Sept. 29, 1960, Ser. No. 59,382
9 Claims. (Cl. 222—185)

This invention relates to metering dispensers, and more particularly, to an automatic dispenser for feeding a predetermined quantity of a detergent material into an automatic clothes washing machine.

Most present day clothes washing machines are fully automatic in operation. That is, the clothes are merely placed in the tub of the machine and the machine is started whereupon an automatic electrical control system takes the machine successively through the wash, spin dry, rinse and dry cycles. This is accomplished without any need for attention on the part of the operator who, for all practical purposes, can place the clothes in the machine, then start the machine and then ignore it until the clothes are finished.

There is one phase of the operating cycle, however, which has never been successfully automated. That is, early in the wash cycle or, perhaps, soon after the clothes are initially placed in the machine, the operator is required to measure a quantity of detergent material by hand and dump it into the machine. There have been several attempts to provide an automatic dispenser for this function in order to eliminate this manual operation. Most dispensers of this nature have met with little or no success for any number of reasons. Primarily, they have been unsuccessful because of the physical properties of most detergent materials, namely their tendency to lump and adhere in the hot and humid atmospheres created in automatic washing machines.

The principal object of this invention is to obviate difficulties heretofore encountered with other types of automatic granules dispensers and provide a reliable automatic dispenser which will operate efficiently and effectively through many hundreds of cycles of an automatic washer.

Another object of this invention is the provision of a metering dispenser for automatic washers which has a vertically movable metering valve which will accurately meter detergent materials.

Still another object of this invention is the provision of a metering dispenser which has a novel cut-off valve construction to stop the flow of detergent, said valve being so constructed that it will not become clogged due to the adherence of detergent particles or lumping of same.

Yet another object of this invention is the provision of a cut-off valve for a metering dispenser that is also effective as a moisture barrier to prevent the hot and moist atmosphere in the washing machine from reaching the storage hopper of the dispenser thereby preventing lumping of detergent materials which results in inefficient dispenser operation.

A further object of the invention is the provision of a metering dispenser which is adjustable so that the operator can set the amount of detergent material that will be dispensed into the tub of the washing machine.

Briefly stated, the present invention contemplates a metering dispenser mounted above the tub of an automatic washer which is composed of a storage hopper having an orifice in its lower portion; a metering valve is suspended over the orifice but normally rests thereon to close the orifice and prevent flow of granules into the washer. A resilient flexible tube is attached to the orifice and its lower end projects toward the wash machine tub. Means are provided for pressing the flexible tube shut and for releasing same in response to a signal from the electrical washer control. Means are provided for lifting the metering valve to a predetermined height whereupon a measured quantity of granules will flow past the metering valve for discharge through the orifice. The metering valve is then released and is thereafter supported by the granules which had previously flowed past it.

The flexible tube is then released, pemitting a quantity of granules to flow through the orifice and into the washing machine. Simultaneously, the metering valve falls by gravity until it covers the orifice to prevent further discharge of detergent material until the machine is ready for another cycle.

Figure 2:
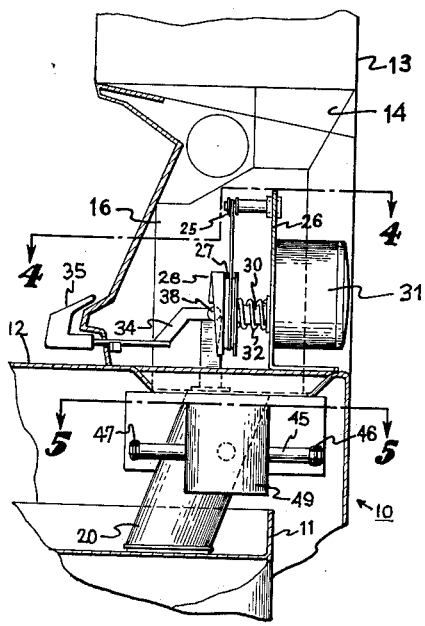
Figure 3:
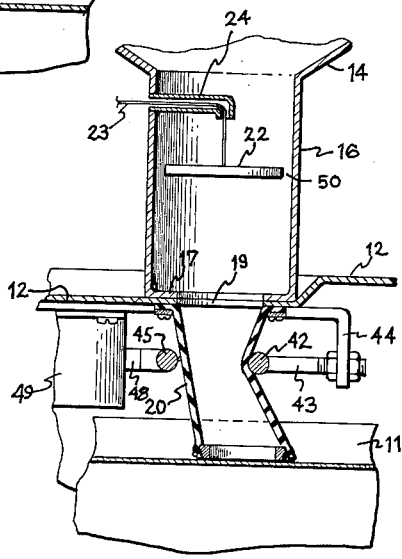

While the specification concludes with claims particularly pointing out and distinctly claiming the subject matter regarded as forming the present invention, it is believed the invention will be better understood from the following description taken in connection with the accompanying drawing in which:

FIGURE 1 is a fragmentary side elevation, partly in cross section showing one embodiment of the metering dispenser mounted in a typical automatic washing machine; and FIGURE 2 is a fragmentary end elevation, in cross section, taken along the line 2—2 of FIGURE 1 showing in some detail the mechanism for raising the metering valve and adjusting its travel; and FIGURE 3 is an elevation, in cross section, of the metering dispenser similar to FIGURE 1 in which the clamping jaws for the resilient tube are in the open position and the metering valve is raised; and FIGURE 4 is a plan view, partly in cross section, taken along the line 4—4 of FIGURE 2 and showing additional details of the mechanism for raising the metering valve; and FIGURE 5 is a plan view, partly in cross section, taken along the lines 5—5 of FIGURE 2 showing the resilient tube and details of the mechanism for clamping the resilient tube shut; and FIGURE 6 is a fragmentary elevation taken along the lines 6—6 of FIGURE 4 showing details of the cam and clutch for raising the metering valve; and FIGURE 7 is an elevation, in cross section, of another embodiment of the present invention in which the metering valve is mounted within the main body of the storage hopper.

The invention will first be described with respect to the embodiment illustrated in FIGURES 1 through 6. Referring initially to FIGURE 1, a casing of a washing machine is generally indicated at 10. The washing machine 10 has a tub 11 which is mounted within the washer by conventional means. A wall 12 above the tub 11 is used to mount the metering dispenser.

The dispenser is composed of a storage hopper 13 which is preferably of sufficient size to hold the contents of a large or king size package of detergent material such as detergent granules or the like. The bottom portion of the storage hopper 13 is in the form of a downwardly sloping wall 14 which terminates in an opening 15. A valve guide 16 is secured to the periphery of the opening 15. The lower portion of the valve guide 16 terminates in an inturned flange 17 resting on the edge of an opening 18 in the wall 12. The opening 18 in the wall 12 and inner edge of the flange 17 form an orifice 19.

A resilient tube 20 is attached to the underside of the opening 18 in the wall 12 so that any granules flowing through the orifice 19 will enter the resilient tube 20. The lower portion of the resilient tube 20 is fitted with a rigid ring 21 in order to prevent that portion of the tube 20 from distorting when the tube is pinched shut as shown in FIGURE 1.

Means for metering a fixed quantity of detergent material flowing downwardly from the storage hopper 13 and through the orifice 19 are provided. As shown in FIGURE 1, a disk-type metering valve 22 normally rests on the orifice 19. A cord 23 is attached to the metering valve 22 and extends upwardly and through the guide 24 and around the idler pulley 25 which is mounted on a support plate 26 as shown in FIGURE 2. The end of the cord 23 is wrapped around a drum member 27 which has a face cam 28 on its side surface.

The drum member 27, as shown in FIGURE 6, has a keyway 29. The drum member 27 is mounted to rotate freely on the shaft 30 extending from the motor 31 which in turn is mounted on the support plate 26. The spring 32 (shown in FIGURE 2) normally urges the drum member 27 away from the support plate 26. As shown in FIGURE 6, the shaft 30 is provided with a key 33 which is normally in the position shown in FIGURE 6 and is out of engagement with the keyway 29 and to the left of the drum member 27 (as viewed in FIGURE 2) when the motor 31 is not turning. The motor 31 operates on the principle of a one revolution clutch.

A lever 34 (see FIGURE 4) having a handle 35 is pivoted at 36 and has an arm 37 terminating in a cam follower 38. The cam follower 38 normally bears against the face cam 28 on the side surface of the drum member 27. The lever 34 can be positioned in any one of the slots 39, 40, or 41 shown in FIGURE 4 in order to change the position of the cam follower 38. The slots 39, 40, and 41 are calibrated in increments of ¾, 1 or 1¼ cups respectively or they can be calibrated on some other scale so that the operator can fix the amount of detergent material that will be dispensed into the washing machine before the cycle is initiated. The manner in which this is accomplished will become evident on further reading of this specification.

Referring now to FIGURES 1 and 5, the resilient tube 20 is normally clamped shut by a stationary jaw 42 supported by the member 43 which is attached to a stationary support 44 secured to the wall 12. The other portion of the clamp is formed by a movable jaw 45 which pinches the resilient tube 20 against the stationary jaw 42 due to the tension in the springs 46 and 47 the ends of which also are attached to the support 44. The movable jaw 45 has a member 48 attached near its center portion. The member 48 extends from a solenoid 49 which is normally deenergized. The solenoid 49 can be energized by a conventional switch actuated either by the main timing device (not shown) or by the revolution of the motor 31. When the solenoid 49 is energized, the movable jaw 45 is moved to the left, as viewed in FIGURE 3, overcoming the force of springs 46 and 47 thereby releasing the clamping force on the resilient tube 20. This results in a condition substantially as shown in FIGURE 3.

Having now described the structure of the embodiment illustrated in FIGURES 1 through 6, its mode of operation will now be set forth in some detail. Initially, the resilient tube 20 is clamped shut as shown in FIGURE 1 and the metering valve 22 rests on the orifice 19 again as shown in FIGURE 1. The storage hopper 13 is filled with detergent material whereupon the washing machine 10 can be filled with dirty clothes and started on its automatic cycle.

At the proper time in the cycle, the automatic control for the washing machine energizes the motor 31 and causes it to rotate for one revolution. Initially, the key 33 in the shaft 30 does not engage the keyway 29 in the drum member 27 since the key 33 is positioned as shown in FIGURE 6 when at rest. The shaft 30 is rotated clockwise (as viewed in FIG. 6) until the key 33 lines up with the keyway 29. The spring 32 then urges the drum member 27 outwardly so that the key 33 enters the keyway 29 whereupon rotation of the drum member 27 is initiated. Rotation of the drum member 27 will, of course, cause the cord 23 to coil up on the drum member 27 thus raising the metering valve 22.

The metering valve 22 is somewhat smaller than the periphery of the valve guide 16 forming an annular space 50 as shown in FIGURE 3. The annular space 50 is sufficiently wide to permit detergent material to flow through the annular space 50 as the metering valve 22 is raised in the valve guide 16. After the metering valve 22 has raised a given distance, the cam follower 38 which is in a fixed position and bears against the face cam 28, causes the drum member 27 to move axially to the right (as viewed in FIGURE 2) thereby slowly compressing the spring 32. After sufficient axial movement of the drum member 27 due to the interaction of the face cam 28 and the follower 38, the keyway 29 disengages the key 33 thus stopping rotation of the drum member 27 and ending the upward movement of the metering valve 22. The motor 31 completes its single revolution until the key 33 is again in the position shown in FIGURE 6. Once having been raised, however, the metering valve 22 remains in position since the granules that have flowed past the annular space 50 fill the void beneath the valve 22 and support it until the beginning of the next step in the operating cycle.

After the metering valve 22 has been raised, the solenoid 49 is energized, moving the jaw 45 to the position indicated in FIGURE 3 whereupon the granules beneath the metering valve 22 fall by gravity into the tub 11. Simultaneously, the metering valve falls due to the effect of gravity, and the weight of granules resting on it (when additional detergent material remains in the hopper 13), until it again closes the orifice 19. The drum member is rotated counterclockwise (as viewed in FIG. 6) as the valve 22 falls until it comes to rest with the keyway 29 in the position shown in FIGURE 6. The solenoid 49 is then deenergized and the springs 46 and 47 return the jaw 45 so that the parts again assume the position shown in FIGURE 1. The device is then ready for the next washing cycle.

A modified form of the invention is illustrated in FIGURE 7. A storage hopper 51 is provided with a downwardly sloping wall 52 terminating in a short downwardly projecting extension 53 and an orifice 54. A resilient tube 55 is secured to the orifice 54 in a manner similar to that heretofore described with respect to the previous embodiment. A valve guide 56 is rigidly mounted within the storage hopper 51 and is substantially coaxial with the orifice 54. A plug type metering valve 57 is mounted for vertical movement within the guide 56 and normally rests upon and closes the orifice 54. A pair of rigidly supported guide rods 58 and 59 slide in the holes 60 and 61 of the valve 57 to maintain an annular clearance space 62 between the valve 57 and guide 56. This prevents the valve 57 from binding in the guide 56 due to inadvertent misalignment or due to the characteristics of the detergent material. A cord 63 is attached to one end of the metering valve 57. The cord 63 can be attached to a device similar to the one heretofore described for lifting the metering valve of the embodiment of FIGURES 1 through 6. Similarly, the stationary clamping jaw 64 and the movable clamping jaw 65 as well as their operating means can be constructed in much the same way as the clamping jaws 42 and 45 of the previous embodiment.

The operation of the embodiment of FIGURE 7 is very much the same as in the previous embodiment. The metering valve 57 is first raised to a predetermined height whereupon a given quantity of detergent material flows through the annular space created when the metering valve 57 is raised. The detergent material that has flowed through the opening and into the tube 55 above the jaws 64 and 65 supports the metering valve 57 after the drum member 27 is disengaged from the key 33 so that the metering valve 57 may fall freely. Next, the movable clamping jaw 65 is moved to the left (as viewed in FIGURE 7), opening the resilient tube 55 and permitting the metered quantity of detergent material to fall into the washing machine tub. Simultaneously, the metering valve 57 falls by gravity to cover the orifice 54 and to prevent further flow of detergent material from the hopper 51 into the machine. The resilient tube 55 is clamped shut by bringing the movable jaw 65 into clamping position as shown in FIGURE 7. During downward movement of the metering valve 57, a small additional quantity of detergent material may flow into the orifice 54. This quantity is relatively small, however, and allowance for it can be made when calibrating the dispenser as it is substantially constant. As in the previous embodiment, the dispenser can be recycled as necessary on successive washing cycles to dispense granules into the machine automatically at the proper time.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. A detergent dispenser for an automatic clothes washing machine comprising a storage hopper, a valve guide mounted within said hopper and terminating in a discharge orifice, a resilient tube connected to said orifice and extending into said washing machine, a plug-type metering valve capable of substantial vertical movement in said valve guide, means for raising said metering valve, clamp means for pinching shut said resilient tube and control means for coordinating the movement of said valve and said clamp means whereby a metered quantity of detergent granules can be dispensed into said clothes washing machine.

2. A detergent dispenser for an automatic clothes washing machine comprising a storage hopper having an orifice in its lower portion, a valve guide spaced from and extending upwardly from said orifice, said valve guide being rigidly mounted within said storage hopper, a plug-type metering valve mounted for vertical movement within said valve guide and normally closing said orifice, said valve being capable of metering a predetermined quantity of detergent material through said orifice when raised, a resilient tube extending from said orifice and into said washing machine, means for normally clamping shut said resilient tube, means for raising said valve in order to meter a fixed quantity of detergent material, means thereafter to release the clamping force on said resilient tube whereby the fixed quantity of detergent material is dispensed into said clothes washing machine and said valve falls by gravity to close said orifice.

3. A detergent dispenser for an automatic clothes washing machine comprising a storage hopper having an orifice in its lower portion, a valve guide spaced from and extending upwardly from said orifice, a resilient tube extending downwardly from said orifice and having its open end extending into said washing machine, a plug-type metering valve normally covering said orifice, an annular space being formed when said valve is raised within said guide to permit detergent material to flow through the orifice and into the resilient tube, means for normally clamping shut said resilient tube, means for raising said valve to a predetermined height whereby a metered quantity of detergent material flows into the resilient tube to fill same above the clamp, means for thereafter releasing the clamping force on said resilient tube whereby the metered quantity of detergent material falls into the washing machine and said valve falls by gravity to close said orifice.

4. A detergent granules dispenser for an automatic clothes washing machine comprising a storage hopper having a quantity of detergent granules therein, said storage hopper having a sloping bottom wall with an opening in its lowermost portion, a discharge orifice located beneath said hopper and in communication with said opening therein, a resilient flexible tube attached to the outlet of said orifice and extending downwardly into said clothes washing machine, means for normally clamping said resilient tube, a metering valve normally resting on said orifice to cover same, a valve guide member surrounding said metering valve in spaced relation thereto, said valve guide extending upwardly from said discharge orifice and being coaxial therewith, means for raising the metering valve a predetermined distance to permit a quantity of detergent granules to flow around and under the metering valve and thereby fixing the volume of detergent granules that will be dispensed, means for disengaging said means for raising said metering valve after the granules have flowed downwardly to fill the space beneath said metering valve so that the metering valve is supported by the granules that have filled said space, means for releasing the clamping force on said resilient tube after said metering valve has been raised to a predetermined height and after its raising means have been disengaged thereby permitting the metered granules that have flowed past said metering valve to drop into the clothes washing machine and simultaneously permitting said metering valve to fall by gravity to its original position covering said discharge orifice.

5. A detergent granules dispenser as claimed in claim 4 including means for varying the height to which the metering valve is raised whereby the quantity of metered detergent granules can be varied, said last mentioned means including a one revolution clutch and a pivoted lever including means for controlling the point at which said clutch is disengaged.

6. A detergent dispenser for an automatic clothes washing machine comprising a storage hopper containing a quantity of detergent granules therein, said storage hopper having a sloping bottom wall with a discharge opening in the lowermost portion thereof, a valve guide projecting downwardly from said opening and having a discharge orifice at its lower end, a resilient tube attached to said discharge orifice and projecting downwardly into said clothes washing machine, means for normally clamping said resilient tube, a disk type metering valve normally resting on and covering said discharge orifice, an annular clearance space between said metering valve and said valve guide whereby detergent granules can flow downwardly around said metering valve when it is raised, means for raising the metering valve to a predetermined height to permit a quantity of detergent granules to flow around and under the metering disk and thereby fixing the volume of detergent granules that will be dispensed, means for disengaging said means for raising said metering valve after the detergent granules have filled the space beneath said metering valve so that the metering valve is supported by the granules that have filled said space, means for releasing the clamping force on the resilient tube after said metering valve has been raised to its predetermined height and its raising means have been disengaged thereby permitting the metered granules that have flowed past said metering valve to drop into the clothes washing machine and simultaneously permitting said metering valve to fall by gravity to its original position covering said discharge orifice.

7. A detergent granules dispenser as claimed in claim 6 including means for varying the height to which the metering valve is raised whereby the quantity of metered detergent granules to be dispensed can be varied, said last mentioned means including a one revolution clutch and a pivoted lever including means for controlling the point at which said clutch is disengaged.

8. A detergent granules dispenser as claimed in claim 6 including means for varying the height to which the metering valve is raised whereby the quantity of metered detergent granules to be dispensed can be varied, said last mentioned means including a single revolution motor having an extending shaft with a projecting key, a drum member having a keyway mounted for rotation on said shaft, a cord attached to said metering valve at one end and wrapped on said drum at the other end, said drum member having a face cam, means for urging the keyway in said drum member to engage the key on said shaft after rotation of the shaft has been initiated and means bearing against said face cam to move said drum axially on said shaft as it rotates so that the keyway in said drum member becomes disengaged from said key after the metering disk has been raised to a predetermined height.

9. A detergent granules dispenser as claimed in claim 8 wherein said means bearing against said face cam comprises a cam follower, said cam follower being mounted for free rotation at one end of a pivoted lever, a plurality of calibrated notches, the other end of said lever being positioned in one of said calibrated notches to fix the quantity of detergent granules being dispensed.

References Cited in the file of this patent

UNITED STATES PATENTS

| | | |
|---|---|---|
| 2,726,019 | Moran | Dec. 6, 1955 |
| 2,746,640 | Swenson | May 22, 1956 |
| 2,912,143 | Woolfolk | Nov. 10, 1959 |
| 2,919,052 | Janquart | Dec. 29, 1959 |
| 2,972,434 | James | Feb. 21, 1961 |